(12) United States Patent
Rolli

(10) Patent No.: US 11,985,922 B2
(45) Date of Patent: May 21, 2024

(54) AGRONOMIC METHOD FOR THE PRODUCTION OF VEGETABLES AND MUSHROOMS

(71) Applicant: INDUSTRIE ROLLI ALIMENTARI S.P.A., Roseto degli Abruzzi (IT)

(72) Inventor: Gian Paolo Rolli, Frazione San Michele di Tiorre (IT)

(73) Assignee: INDUSTRIE ROLLI ALIMENTARI S.P.A., Roseto Degli Abruzzi (IT)

( * ) Notice: Subject to any disclaimer, the term of this patent is extended or adjusted under 35 U.S.C. 154(b) by 170 days.

(21) Appl. No.: 15/759,455

(22) PCT Filed: Sep. 11, 2015

(86) PCT No.: PCT/IT2015/000222
§ 371 (c)(1),
(2) Date: Mar. 12, 2018

(87) PCT Pub. No.: WO2017/042843
PCT Pub. Date: Mar. 16, 2017

(65) Prior Publication Data
US 2019/0373823 A1    Dec. 12, 2019

(51) Int. Cl.
*A01G 22/00*    (2018.01)
*A01G 22/15*    (2018.01)
*A01G 22/40*    (2018.01)

(52) U.S. Cl.
CPC ............. *A01G 22/00* (2018.02); *A01G 22/15* (2018.02); *A01G 22/40* (2018.02)

(58) Field of Classification Search
CPC .............................. A01G 22/00; A01G 24/00
See application file for complete search history.

(56) References Cited

U.S. PATENT DOCUMENTS

| | | | | |
|---|---|---|---|---|
| 2007/0148203 A1* | 6/2007 | Parker | ..................... | A01N 43/22 424/410 |
| 2008/0202259 A1* | 8/2008 | Stewart | .................. | G01N 1/286 73/863 |
| 2009/0322357 A1* | 12/2009 | Beaulieu | ................. | G01V 3/088 324/692 |
| 2011/0197641 A1* | 8/2011 | Volcan | ..................... | C05F 5/002 71/24 |
| 2014/0213656 A1 | 7/2014 | Tokubuchi et al. | | |
| 2015/0061888 A1 | 3/2015 | Lankford et al. | | |
| 2015/0106280 A1* | 4/2015 | Klavins | ................ | G06Q 10/063 705/317 |
| 2016/0078570 A1* | 3/2016 | Ethington | .............. | G06Q 10/06 705/7.21 |
| 2016/0122750 A1* | 5/2016 | Wigley | .................... | A01N 63/00 506/1 |

FOREIGN PATENT DOCUMENTS

| | | |
|---|---|---|
| CN | 101350096 A | 1/2009 |
| CN | 102475029 A | 5/2012 |
| CN | 103355092 A | 10/2013 |
| CN | 103927685 A | 7/2014 |
| JP | H11299351 A | 11/1999 |
| JP | 2000083476 A | 3/2000 |
| JP | 2002153127 A | 5/2002 |
| JP | 2003509023 A | 3/2003 |
| JP | 2003189742 A | 7/2003 |
| JP | 2004199332 A | 7/2004 |
| JP | 2004310374 A | * 11/2004 |
| JP | 2004310374 A | 11/2004 |
| JP | 2004326345 A | 11/2004 |
| JP | 2005135235 A | 5/2005 |
| JP | 2007139639 A | 6/2007 |

(Continued)

OTHER PUBLICATIONS

"Evaluation of Pesticide Residues for estimation of maximum residue levels and calculation of dietary intake" Food and Agriculture Organization of the United Nations, Rome, 2011.*

(Continued)

*Primary Examiner* — Magdalena Topolski
(74) *Attorney, Agent, or Firm* — CANTOR COLBURN LLP

(57) ABSTRACT

An agronomic method for the production of vegetables and mushrooms, includes the steps of
  performing a preventive chemical, physical and pedologic analysis of the soils intended for cultivation, in order to identify their composition, hydrologic characteristics, and verify the absence of pathogens, infesting organisms and pollutants;
  selecting among natural seeds and mycelia, not genetically modified, the ones most suitable for the parameters of the soil identified previously; and
  performing iterated periodic checks on the vegetable, mushroom species, that grow after seeding, in order to detect biotic adversities and/or infestations thereof.
The method further includes the steps of performing at least one plant protection treatment by using active ingredients selected among insecticides, herbicides, acaricides, limacides and fungicides;
  near the time of harvest, performing iterated periodic spot checks of the vegetables, mushrooms, in order to measure the residual concentration of active plant protection principles; and
  upon sampling to assess the residual concentration of active plant protection principles lower than 0.01 mg/kg, harvesting the cultivated vegetables, mushrooms.

13 Claims, No Drawings

(56) References Cited

FOREIGN PATENT DOCUMENTS

| JP | 2012080790 A | 4/2012 |
|---|---|---|
| JP | 5250845 B2 | 7/2013 |
| WO | 2006125644 A1 | 11/2006 |
| WO | 2012164698 A1 | 12/2012 |
| WO | 2012169473 A1 | 12/2012 |

OTHER PUBLICATIONS

EPO residual standards, expert, https://ec.europa.eu/food/plant/pesticides/eu-pesticides-database/mrls/?event=download. MRL (Year: 2008).*
New Rules on pesticide residues in food (Year: 2008).*
Primus Labs. Food Safety Services, Pesticide Residue Analyses, Top 10 Questions asked by Customers. https://web.archive.org/web/20150816085707/http://www.primuslabs.com/services/TopTenQuestionsPesticides.aspx (Year: 2015).*
Medallion Labs. Pesticide Multi-Residue Analysis (MRA)—Glyphosate Test. https://www.medallionlabs.com/tests/pesticide-multi-residue-analysis-glyphosate-screen/ (Year: 2024).*
Center for Agriculture, Food, and the Enviroment. Soil and Plant Nutrien Testing Laboratory. https://ag.umass.edu/services/soil-plant-nutrient-testing-laboratory/ordering-information-forms/turnaround-time-for-routine-soil-analysis (Year: 2024).*
Primus Labs. Microbiological and Pesticide Residue Testing Laboratories. https://www.primuslabs.com/ (Year: 2024).*
International Search Report dated Feb. 4, 2016 re: Application No. PCT/IT2015/000222; pp. 1-4, citing: R. Bongiovanni et al. "Precision Agriculture . . . ", K. G. Cassman "Ecological intensification . . . ", US 2015/061888 A1 and CN 103 927 685 A.
K. G. Cassman et al. "Ecological intensification of cereal production systems: Yield potential, soil quality, and precision agriculture", Proceedings of the National Academy of Sciences, May 25, 1999, vol. 96, No. 11, pp. 5952-5959, XP055244984.
R. Bongiovanni et al. "Precision Agriculture and Sustainability", Precision Agriculture, Aug. 1, 2004, vol. 5, No. 1, pp. 359-387, XP019214621.
Written Opinion dated Feb. 4, 2016 re: Application No. PCT/IT2015/000222; pp. 1-4, citing: R. Bongiovanni et al. "Precision Agriculture . . . ", K. G. Cassman "Ecological intensification . . . ", US 2015/061888 A1 and CN 103 927 685 A.
JP Office Action dated Feb. 24, 2021, re: Application No. 2018-533289, pp. 1-4, citing: JP 2004-310374A, JP 5250845A, JP H 11-299351A, JP 2003-189742A, JP 2002-153127A, JP 2005-135235A, WO2012/169473 and WO2012/164698.
CN Office Action issued Dec. 15, 2020 re: Application No. 2015800830359, pp. 1-15, citing: Xiaohong LI et al. "New Technology for High-Yield . . . " and Xinhua CIA "Pracitcal Manual on Engineering Standards . . . "
Xiaohong Li et al. "New Technology for High-Yield Cultivation of Bean Crops", Jan. 31, 2015, pp. 44.
Xinhua Cai, "Practical Manual on Engineering Standards and Current Policy and Legislature, of Agroecological Environment: Analysis of Respresentative Case", Mar. 31, 2003, vol. 2, pp. 1244-1246.
CA Office Action dated Sep. 20, 2021 Re: Application No. 2,998,109, pp. 1-6, citing: Bongiovanni et al. "Precision Agriculture . . . ", WO 2006/125644 A1, US 2015/061888 A1, US 2014/0213656 A1 and JP 2004-310374 A.
JP Office Action dated Jun. 23, 2022 re: Application No. 2018-533289, pp. 1-5.
Chinese Decision of Reexamination for Chinese Application No. 201580083035.9, dated Jun. 16, 2023, 15 pages with translation.
Canadian Office Action for Application No. 2,998,109, dated May 3, 2023, 7 pages.

\* cited by examiner

AGRONOMIC METHOD FOR THE PRODUCTION OF VEGETABLES AND MUSHROOMS

TECHNICAL FIELD

The present disclosure relates to an agronomic method for the production of cultivated vegetables and mushrooms (usually suitable for producing agricultural products), aimed at obtaining products that contain a minimal quantity of pesticides (i.e., lower than 0.01 parts per million, ppm), also ensuring a minimal dispersion thereof into the environment, with a consequent reduction of agriculture-derived pollution.

BACKGROUND

Modern agriculture is based on the use of plant protection products to protect crops against pests, parasites and diseases, in order to maximize the obtainable harvest. The use of plant protection products, though being based on the use of synthetic active ingredients on which innovation activity to render them increasingly less dangerous is high, over time can have a toxic effect on human beings and on the environment.

The impact of a specific active ingredient is subjected continuously to analysis in order to assess its level of danger for human beings on the basis of the doses taken; the basic problem is that the consumer, based on his diet, can find himself taking in significant total quantities of a specific active ingredient as a consequence of the simultaneous consumption of foods based on vegetables treated with it.

Moreover, it should be noted that the intake of vegetables treated with various active ingredients can lead, for an individual, to the possibility of coming into contact simultaneously with a plurality of these ingredients: any combined effects of such active ingredients might generate even severe consequences on the health of the consumer. Unfortunately it is not possible, due to the large number of active ingredients in use and due to the very high number of possible combinations thereof, to analyze and estimate such combined effects.

In this regard, an investigation by the EFSA (European Food Safety Authority) conducted in 2013 on 80,976 samples of food products in 29 different countries, aimed at detecting any presence of 685 types of pesticide, revealed a generally regular situation (i.e., compliant with the limitations prescribed by applicable statutory provisions in 97.4% of the cases) as regards the level of presence of the individual molecules, but found a significant incidence of samples (between 15% and 20%) that showed the simultaneous presence of different active ingredients.

This situation has prompted the European Union to lean toward a more cautious and restrictive approach to the use of pesticides, especially where there are uncertainties in knowledge regarding the combined effect of different substances that might however have the same impact on the human body (for example substances that determine a reduction of thyroid functionality).

Currently, European Standards (mention is made in particular of EC Regulation no. 396/20052005 and subsequent amendments related to the maximum levels of residues of pesticides in or on food products and feed of plant and animal origin, EC regulation no. 1107/2009 related to the placing of plant protection products on the market and EC regulation no. 128/2009 related to the sustainable use of pesticides) allows the use in agriculture of approximately 500 active ingredients, defining the maximum residue levels (MRL) on the individual products. The list is updated constantly and is accessible at the corresponding webpage of the European Union.

http://ec.europa.eu/food/plant/pesticides/eu-pesticides-database/public/?event=homepage&language=EN For all the active ingredients for which it is not mentioned specifically, the reference value applied is the maximum threshold of 0.01 mg/kg, i.e., the experimental detectability threshold for many active ingredients. For example, on pea crops (Pisum sativum Asch. et Gr.) in 2015 the use of 52 different registered active ingredients is allowed; among these, however, only four of them must not leave detectable traces on the vegetable, while higher allowed residue values are provided for the others.

There is, therefore, the tangible possibility that an individual might come into contact with a plurality of different active ingredients (for example by eating various vegetables) even in considerable quantities although the ingested active ingredients, taken individually, are still within the limits allowed by the European Union.

The farmer is in fact required exclusively to comply with the regulations prescribed by the law with Obligatory Integrated Management or, for those who follow Integrated Production, to use a more restrictive list of pesticides with specific threshold values (which can be drafted by assigned local authorities such as for example, for Italy, Regions).

In any case, the methods of use of each individual pesticide reference exclusively the instructions of the corresponding manufacturer: however, a final verification of actual compliance with applicable statutory provisions, in terms of levels of residues of pesticides present on the final harvest, is not provided.

The alternative to the use of pesticides according to the regulations set by the assigned government bodies, intended for the production of vegetables that are safer for consumers and for the environment, is so-called organic farming However, though being unquestionably safer in relation to the extreme reduction (and even total elimination) of synthetic substances that can be traced in vegetables produced in compliance with its criteria, it is characterized by significantly lower productivity (even 30% lower). Moreover, organic farming provides for the use of natural pesticides that can be dangerous for health (such as for example pyrethrins) and/or have a high environmental impact (such as for example marc sulfate, sodium nitrate and copper sulfate).

In any case, the regulations related to organic farming also are intended to regulate the agronomic process to be performed, without however verifying and certifying the finished product, which might remain contaminated (even unintentionally) over the course of the crop cycle.

SUMMARY

The aim of the present disclosure is to solve the problems described above, by providing an agronomic method for the production of vegetables and mushrooms that allows to maintain, in the vegetables and mushrooms cultivated in compliance with the corresponding prescriptions, minimal residues of pesticides, lower than a predefined threshold, such as for example 0.01 mg/kg.

Within this aim, the disclosure provides an agronomic method for the production of vegetables and mushrooms that is suitable to ensure high agricultural productivity.

The disclosure also provides an agronomic method for the production of vegetables and mushrooms that determines a lower environmental impact than that of cultivation strategies of the known type.

The disclosure further provides an agronomic method for the production of vegetables and mushrooms that has different steps, even just in relation to some aspects, with respect to those of cultivation strategies of the known type.

The present disclosure provides an agronomic method for the production of vegetables and mushrooms cultivated at low costs, simple to provide in practice and safe in application.

This aim, as well as these and other advantages that will become better apparent hereinafter, are achieved by providing an agronomic method for the production of vegetables and mushrooms, characterized in that it comprises the steps of performing a preventive chemical, physical and pedologic analysis of the soils intended for cultivation, in order to identify their composition, hydrologic characteristics, and verify the absence of pathogens, infesting organisms and pollutants;

selecting among natural seeds and mycelia, not genetically modified, the ones most suitable for the parameters of the soil identified previously;

performing iterated periodic checks on the vegetable, mushroom species, that grow after seeding, in order to detect biotic adversities and/or infestations thereof;

performing at least one plant protection treatment by using active ingredients selected among insecticides, herbicides, acaricides, limacides and fungicides;

near the time of harvest, performing iterated periodic spot checks of the vegetables, mushrooms, in order to measure the residual concentration of active plant protection principles; and upon sampling to assess the residual concentration of active plant protection principles lower than 0.01 mg/kg, harvesting the cultivated vegetables, mushrooms.

DETAILED DESCRIPTION

Further characteristics and advantages of the disclosure will become better apparent from the description of a preferred but not exclusive embodiment of the agronomic method for the production of vegetables and mushrooms according to the disclosure.

The aim of the present disclosure is to ensure a large-scale production of vegetable products with residues of active ingredients lower than a predefined threshold, such as for example 0.01 mg/kg, thus obtaining a safer product without compromising harvest yield.

It is specified that this predefined threshold might be, with particular reference to some possible ways of application of the present disclosure, the limit of experimental detectability.

The result that one wishes to obtain is therefore highly restrictive on the obtained agricultural product.

The method according to the disclosure is particularly interesting in terms of large-scale production, since as it is not possible to renounce the use of certain active ingredients, their use rigidly coded by a selective and repeatable protocol allows to safeguard the harvests and obtain an agricultural product in which the residues are lower than a predefined threshold (for example 0.01 mg/kg or, according to a further example of application, with values of residues that cannot be detected experimentally), a result that is proven by targeted chemical analyses on each harvest.

Furthermore, the disclosure also allows to have lower residues in the environment (the air, the water table and agricultural soils) and accordingly also on the health of human beings and of animals that are in continuous contact with said environment.

The method of management of the cultivation process on which the disclosure is based receives in a more restrictive, organized and strict manner the orientations of currently applicable statutory provisions (and in particular of European Union standards) in terms of cultivation methods and of allowed treatments for crop protection. Moreover, the method according to the disclosure does not allow the possibility, as instead allowed by currently applicable statutory provisions (and in particular by European standards), of having, for some active ingredients, residues higher for example than 0.01 mg/kg (i.e., parts per million, ppm).

Furthermore, the disclosure processes analytically and selectively the guidelines prescribed by Obligatory Integrated Management in terms of application of methods for the prevention and monitoring of pests and of infections on crops (the activity of selection and processing of the prescriptions of the guidelines is provided in compliance with said prescriptions and is therefore performed in full compliance with the law): this activity is possible by specifying rigorously the applicable cultivation practices and by providing for a coded use of specific plant protection products.

Furthermore, the present disclosure provides for the rigorous adoption of some Integrated Production techniques (also known as Voluntary Integrated Management) i.e., the system of specific plant protection techniques and indications to be adopted in a binding manner for each crop and regulated, in the Italian case, by appropriate regional regulations. This activity is possible by specifying rigorously the applicable cultivation practices and by providing for a coded use of specific plant protection products.

The agronomic method for the production of vegetables and mushrooms according to the disclosure includes a series of consecutive steps, some of which are reiterated according to specific cycles.

First of all, it is necessary to perform a preventive chemical, physical and pedologic analysis of the soils intended for cultivation, in order to identify at least partially their composition, hydrological characteristics, and verify the absence of pathogens, infesting organisms and pollutants.

According to the disclosure, it is therefore necessary for a technical agricultural engineer to perform several inspections in the field throughout all the steps of the cultivation, including those that precede seeding.

In particular, preventive analyses of the soil includes verifying the physical-chemical conditions of the soils.

The fields for the cultivations must therefore be selected by avoiding the presence, in the vicinity, of potentially polluting sites, verifying the texture of the soils, their slope, the availability of water and trying to minimize the distance from the processing facility.

In order to optimize production, optional preventive weeding and/or fertilization operations are also provided: these steps, also, must take into account the need to minimize the introduction in the environment of harmful substances, and are therefore performed by using herbicides and/or fertilizers that have a low environmental impact and can be absorbed by the soil, leaving negligible residual quantities of potentially pollutant substances (in any case lower than predefined threshold values).

It is therefore necessary to select, among natural seeds and mycelia, not genetically modified, the ones that are most suitable for the soil parameters identified previously.

The seeds used, as well as the mycelia of the mushrooms, must be selected among the varieties specifically identified by the wording "OGM FREE". Moreover, they must have specific varietal characteristics that make them suitable to obtain the maximum harvest yield and limit the need for treatments: to obtain such characteristics, it is necessary to identify the seeds (or mycelia) that are most suited for the characteristics of the soil in which they will be placed; each individual type of seed and/or mycelium ensures the best yield if placed in a soil that has given characteristics. The pairing of a specific seed (mycelium) with a respective soil therefore allows to ensure optimum productivity and also to ensure a high quality standard of the vegetables (mushrooms) at the end of the cultivation. It is evident that vegetables or mushrooms that can grow in an ideal environment (from a chemical, physical and pedologic profile) are less subject to diseases, infections and infestations and therefore allow to minimize the use of pesticides.

Moreover, the selection of particular varieties (or mycelia) is aimed at ensuring the adequacy of the vegetable or mushroom production that can be obtained with reference to the intended purpose of use (e.g., choice of specific varieties of vegetables to be correctly processed and transformed in an industrial environment).

In this case also, it is specified that the choice of the fertilizer is suitable to ensure that the seeds (mycelia) are in an environment that corresponds as much as possible to the ideal environment (from a chemical, physical and pedologic standpoint) expected by the manufacturer (and/or by the breeder, in the case of new varieties of vegetables).

Once the seeding step has ended, a specialized engineer must perform iterated periodic checks of the vegetables and/or mushrooms, which grow after seeding, in order to detect pathologies and/or infestations of such vegetables.

Performing periodic checks, at short intervals, of the cultivations allows to identify preventively and promptly the presence of diseases and/or infestations and to circumscribe any plant protection treatments to limited areas, or to minimize the dosage thereof in view of the minimal incidence of the disease or infestation on the vegetables and/or mushrooms.

For the reasons listed above it may therefore be necessary, in some cases, to perform at least one plant protection treatment by using active ingredients selected among insecticides, herbicides, acaricides, limacides and fungicides.

These treatments allow to maximize productivity (since they protect the vegetables and mushrooms being cultivated against damage that might be generated by diseases and/or infestations).

Timeliness in performing the plant protection treatment in the steps of first onset (even just sporadic and localized) of diseases and/or infestations also allows to limit the diffusion thereof, also allowing to subject to the site-specific treatment only the affected areas, avoiding any contact with plant protection products of the regions that are not affected.

Proximate to the harvest period, it is further necessary to perform iterated periodic spot checks of the vegetables and/or mushrooms in order to measure the residual concentration of active plant protection ingredients.

Upon detections of the residual concentration of active plant protection ingredients lower than 0.01 mg/kg, it is possible to harvest the vegetables.

With particular reference to the threshold value described so far by way of example, it is important that harvesting occurs at the maturation of the vegetable after verifying that the plant health residues are below 0.01 mg/kg.

It should be noted that some vegetables have specific behaviors that must be assessed by the specialized engineer in order to select the best moment for harvesting (optionally also as a function of the weather conditions, of the night-day cycle and of the seasonal cycle).

Periodic checks comprise a representative sampling from the harvesting field performed by a technical agricultural engineer and the analysis aimed at verifying any presence of a large number of active ingredients (over 400): each one of such active ingredients must be below the predefined threshold, for example equal to 0.01 mg/kilogram (0.01 ppm). The decision to proceed or not with harvesting is assigned exclusively to the technical agricultural engineer, who will authorize it only when the tests confirm the presence, in the cultivated vegetables and/or mushrooms, of a residue of active plant protection ingredients lower than a predefined threshold, for example equal to 0.01 mg/kg.

It is convenient, in terms of the optimum application of the method according to the disclosure, for the operations for measuring the residual concentration of active plant protection ingredients to be performed in a laboratory in which there are gas chromatographs with various detectors (ECD, NPD, FD), gas chromatographs coupled to mass spectrometers, liquid chromatographs with spectrophotometric detectors (diode array) and/or coupled to mass spectrometers of the UPLC-MS (Ultra Performance Liquid Chromatography-Mass Spectrometry) type and atomic absorption spectrophotometers HPLC (High Performance Liquid Chromatography).

By way of example, laboratory instruments suitable to perform the tests provided by the method according to the disclosure are listed hereafter: gas chromatographs, gas chromatographs with mass spectrometer, gas chromatographs with triple quadrupole mass spectrometer (GC/MS), high-performance liquid chromatographs, ultra-performance liquid chromatographs with triple quadrupole mass spectrophotometer (UPLC/MS), gas chromatographs with double electron detector (GC/ECD) for chlorinated compounds, gas chromatographs with double flame photometric detector (FPD) for sulfurous and nitrated compounds, thermionic detectors (NPD) for nitrated compounds, atomic absorption spectrometers (GFAAS), high-performance liquid chromatographs (HPLC) with diode array detectors.

According to the disclosure, it is convenient that the analyses prescribed by the periodic checks occur at qualified laboratories that ensure the reliability of each analytical data item.

It is therefore appropriate for each laboratory in which such analyses may be performed to be accredited or at least able to demonstrate that it can pass successfully the annual tests prescribed by some international verification circuits, known as proficiency testing. Such tests include analyzing samples that contain active ingredients that are unknown in terms of quality and quantity. To pass such tests, the laboratory must be capable of identifying correctly both the active ingredients and their quantities, obtaining an adequate precision.

The laboratory must therefore have adequate instruments for the analysis of the active ingredients, among which mention is made again of a gas chromatograph with triple quadrupole mass spectrometer (GC/MS), an ultra-performance liquid chromatograph with triple quadrupole mass spectrometer (UPLC/MS), a gas chromatograph with double electron detector (GC/ECD) for chlorinated compounds, a gas chromatograph with double flame photometric detector (FPD) for sulfurous and nitrated compounds, and thermionic (NPD), for nitrated compounds, an atomic absorption spectrophotometer (GFAAS), a high performance liquid chromatograph (HPLC) with Diode Array Detector.

It is deemed useful to specify that according to the disclosure, only upon the non-detectability of residues of active ingredients (or in any case upon a detection that is below a predefined threshold value) is it possible to classify the vegetables and/or mushrooms with the definition "without residual pesticides"), achieving the goal of the disclosure.

It is specified that in addition to pesticides, also nitrates and heavy metals, depending on the type of crops, can be analyzed in order to minimize their presence on the harvest.

In order to ensure optimum compliance of the product or products subjected previously to the tests with the ones harvested subsequently (if the test has detected no trace of pesticides), a time comprised between 2 and 24 hours elapses between the sub-step of harvesting the samples of vegetables and/or mushrooms to be examined and the operations for measuring the residual concentration of active plant protection ingredients in the laboratory.

Usually, it is deemed sufficient that the tests can be performed on the products harvested for this purpose within 24 hours, although for some crops it is preferable for these tests to be performed within 6 hours of harvesting.

It is specified that the selected seeds are related to vegetables of the Liliaceae type (such as for example garlic, onion, asparagus, etc.) Solanaceae (such as tomatoes, peppers, potatoes, etc.), Umbelliferae (such as carrots, fennel, etc.), Asteraceae (such as artichoke, chicory, etc.), Lamiaceae (such as for example basil), Brassicaceae (such as savoy cabbage, broccoli, etc.), Cucurbitaceae (such as for example pumpkin, zucchini, etc.), Leguminosae (such as peas, broad beans, etc.) and Chenopodiaceae (such as spinach, beets, etc.).

Likewise, the selected mycelia are related to mushrooms of the Agaricaceae type, preferably of the champignon mushroom type.

The at least one step of execution of at least one plant protection treatment also can in turn be broken down into a series of sub-steps (or, more correctly, preparatory operations) that must be performed under the control and supervision of a specialized engineer.

First of all, it is necessary to select a specific formulation of the active ingredient in use: this choice can be determined by a plurality of factors, for example the presence of excipients that are more or less compatible with the crop of interest and/or with the soil being used, compatibility with the specific method of distribution that will be used, the stage of growth of the vegetable and/or mushroom, and the like.

It is also convenient to select the correct dosage of the active ingredient in use: this choice must be dependent on the extent of the disease, infestation and/or infection in progress and on the growth stage of the vegetable and/or mushroom.

When possible, the specialized engineer must also select the most suitable mode of administration of the active ingredient in use.

As already mentioned, at localized areas where the disease and/or infestation has appeared, the specialized engineer must also proceed with the selection of the regions of the cultivated soil to be treated with the active ingredient.

Finally, the engineer must also assess the ideal environmental and climate conditions for performing the treatment with the selected active ingredient: in particular, he must indicate whether to perform the treatment in conditions of insolation or not (for example by suggesting to wait for a given quantity of solar radiation, independently of actual weather conditions, in some cases even nocturnal distribution), how to behave if precipitations are probable, which is the ideal temperature, etc.

According to some modes of execution of the method according to the disclosure that are particularly effective and suitable to minimize residues in the harvest, the herbicides that can be adopted are selected preferably among Aclinifen, Bentazon, Chloridazon, Chlorpropham, Clethodim, Clomazone, Clopiralid, Cycloxidim, Dicamba, Fenoxaprop-P-Ethyl, Fluazifop P-butyl, Flufenacet, Imazamox, Lenacil, Linuron, Metamitron, Metazachlor, S-Metolachlor, Metribuzin, Napropamide, Oxadiazon, Pandimethalin, Phenmedipham, Propaquizofop, Propyzamide, Pyridate, Quizalofop P-ethyl, Quizalofop P-ethyl Isomer D, Rimsulfuron, Triallate and the like.

Likewise, according to further modes of execution of the method according to the disclosure that are particularly efficient and suitable to minimize residues in the harvest, the insecticides can be selected preferably among Abamectin, Acetamiprid, Acrinathrin, Alpha-cypermethrin, Azadirachtin, Benfluralin, Bufoprezin, Chlorantraniliprole, Chlorpyrifos, Chlorpyrifos Methyl, Cypermethrins (sum of alpha and zeta isomers), Deltamethrin, Emamectin Benzoate, Esfenvalerate, Etofenprox, Flonicamid, Fluvalinate Tau, Formetanate, Fosmet, Imidacloprid, Indoxacarb, Lambda Cyhalothrin, Metaflumizone, Methoxyfenozide, Primicarb, Pymetrozine, Pyrethrins, Spinosad, Spirotetramat, Teflutrin, Thiacloprid, Thiametoxam, Zeta-cypermethrin, and the like.

Likewise, according to further modes of execution of the method according to the disclosure that are particularly efficient and suitable to minimize the residues in the harvest, the acaricides can be selected preferably among Bifenazate, Clofentezine, Etoxazole, Fenpyroximate, Hexythiazox, Spiromesifen, Tebufenpyrad and the like.

Likewise, according to further modes of execution of the method according to the disclosure that are particularly efficient and suitable to minimize residues in the harvest, the fungicides can be selected preferably among Acibenzolar S Methyl, Ametoctradin, Azoxystrobin Benalaxyl, Boscalid, Bupirimate, Cyazofamid, Cyflufenamid, Cymoxanil, Cyproconazole, Cyprodinil, Difenoconazole, Dimetomorph, Famoxadone, Fembuconazole, Fenhexamid, Fluopicolide, Fluazinam, Fludioxonil, Fosetil Aluminium, Iprovalicarb, Mandipropamid, Meptyldinocap, Metalaxyl (isomer sum), Metalaxyl-M, Myclobutanil, Pencozanol, Cupric products/Copper, Propamocarb, Pyraclostrobin, Pyrimethanil, Tebuconazol, Tetraconazol, Trifloxystrobin, Triadimenol, Sulfur, and the like.

Furthermore, according to additional modes of execution of the method according to the disclosure that are particularly efficient and suitable to minimize residues in the harvest, the limacides can be selected preferably among ferric phosphate, metaldehyde, and the like.

It is specified that in order to render traceable each batch of products derived from a harvest obtained by applying the method according to the disclosure, all the data related to each step are catalogued in a specific database and associated with a respective identification string that is provided on the packages with which the product, vegetable and/or mushroom, will be marketed.

The producer that applies the following disclosure must be capable, when requested by his client, to provide full traceability of the product in terms of cultivation site, seeds used, treatments performed, etc., i.e., all the detail information required to give assured indications as to the origin of the product.

The resulting vegetable product can be intended for various uses, in order to obtain a plurality of vegetable-based products, from the freshly consumed product to products that can undergo further transformations (second, third, fourth, fifth range, to recipe-based finished products that include the use of vegetable products).

It is specified that even after harvesting the vegetable and/or mushroom must be treated and transformed with precautions suitable to prevent any possible contamination in subsequent steps up to its sale. The purpose of this additional precaution in the final steps of preparation of the product that will put on sale is necessary so that it can maintain the qualification of "without residual pesticides", i.e., so that even the product on sale has a pesticide residue lower than the limit of 0.01 mg/kg (or other predefined threshold) even if used as an ingredient in a finished product constituted by a plurality of different ingredients (for example ready-made dishes based on vegetables with rice, spelt; etc.).

Therefore, all the other ingredients must have a pesticide residue that is lower than the threshold value.

In order to clarify the operational modes of application of the method according to the disclosure, some examples of application, related to specific vegetable products, are given hereafter: it is specified that these examples are intended exclusively as an illustration and therefore cannot be considered suitable to limit the protective scope of the present disclosure.

EXAMPLE 1

Borlotti Bean

Production region: Abruzzo.
Cultivation cycle: 85 days.
Seeding period: July.
Harvesting period: end of September.
Number of checks on the field by the specialized engineer from seeding to harvesting: at least 15.
Selected varieties: 3 (Etna, Ulisse, Taylor's).
Examples of aspects verified in the field by the specialized engineer 60 days after seeding:
  Presence of attacks by Beaded chestnuts;
  Need for intervention with insecticides such as Deltamethrin, if the presence and/or activity of insects is detected;
  Verification of the need for any irrigation;
  General prediction of the harvest day and expected quantity.
Active ingredients selected for use on this crop: 21 (with respect to the 47 prescribed at the EU level at the filing date of the patent). Among these, mention is made in particular, by way of example, of Azoxystrobin, Bentazone, Lambda Cyhalothrin.
Pre-harvest safety interval to fall within the "without residual pesticides" classification: specific for each active ingredient (e.g., in the case of the active ingredient Deltamethrin for contrasting beaded chestnuts it is 12-15 days).
Examples of treatments during the cultivation cycle.
1. Treatment for weeding prior to emergence of the crop (prior to germination):
  A. Adversities: weeds;
  B. Active ingredients: S-Metolachlor, Pendimethalin;
  C. Dose: respectively 1 liter per hectare and 1.5 liter per hectare;
  D. Safety interval guaranteed by the producer for compliance with the legal limits: not provided for S-Metolachlor, 60 days for Pendimethalin.
2. Treatment for weeding after emergence of the crop (after germination):
  A. Adversity: wide- and narrow-leaf weeds;
  B. Active ingredient: Imazamox;
  C. Dose: 0.6l/ha;
  D. Safety interval guaranteed by the producer for compliance with legal limits: 35 days.
3. Pre-harvest treatment of the crop:
  A. Adversity: beaded chestnuts;
  B. Active ingredient: Deltamethrin;
  C. Dose: 0.5 l/ha;
  D. Safety interval guaranteed by the producer for compliance with legal limits: 7 days.
Number of active ingredients analyzed in the laboratory: at least 400, with the possibility to add further analyses if the specialized engineer (agronomist) deems this appropriate, on the basis of the risk assessments performed in the field.

EXAMPLE 2

Red Pepper

Production region: Apulia.
Cultivation cycle: up to 190 days.
Transplantation period: May.
Harvesting period: from mid August to early November.
Number of checks on the field by the specialized engineer from seeding to harvest: at least 20.
Varieties selected for use: 8 (Pompeo, Aurelio, Tarquino, Solero, Favilla, Gemini, Orazio, Rialto).
Example of aspects verified in the field by the specialized engineer (agronomist) 80-85 days after transplantation:
  general state of the cultivation, percentage of fruits in the color changing step, assessment of the percentage of any fruits exposed to the sun and first estimate of the harvest beginning time:
  presence of any parasite attacks (fungi or insects);
  need for any additions of nutrient elements and of plant treatment interventions.
Active ingredients selected for use on this crop: 41 (with respect to the 85 provided at the EU level at the filing date of the patent). Among these, mention is made by way of example in particular of Abamectin, Azoxystrobin, Myclobutanil.
Pre-harvest safety interval to obtain "zero residue": specific for each active ingredient (for example, in the case of the active ingredient Lambda Cyhalothrin, used as insecticide, it is 8-10 days).
Examples of treatments during the cultivation cycle.
1. Weeding treatment prior to transplantation of the crop (prior to transplantation of the plant):
  A. Adversity: narrow- and wide-leaf weeds;
  B. Active ingredient: Oxadiazon;
  X. Dose: 1.5 liters per hectare;
  D. Safety interval guaranteed by the producer to comply with legal limitations: shortage not required.
2. Pre-harvest treatment of the crop:
  A. Adversity mainly beaded chestnuts and thrips;
  B. Active ingredient: Lambda Cyhalothrin;
  C. Dose: 100 ml/ha;
  D. Safety interval guaranteed by the producer for compliance with legal limits: 3 days.

Number of active ingredients analyzed in laboratory: at least 400, with the possibility to add further analyses if the technical agricultural engineer deems this appropriate on the basis of the risk assessments performed in the field.

EXAMPLE 3

Spinach

Production region: Abruzzo.
Cultivation cycle: 60/65 days.
Seeding period: September.
Harvesting time: end of November.
Number of checks on the field by the specialized engineer from seeding to harvest: at least 10.
Selected seed varieties: 15 (SV1714, Zanzibar, Kangaroo, Tahiti, Elephant, Walibi, Sparrow, Monza, Clarinette, SV3523, Tahiti, Anlani, GNU, Hudson, Solomon).
Examples of aspects verified in the field by the specialized engineer (agronomist) 30 days after seeding:
  Presence of attacks of beaded chestnuts and flies,
  Presence of weeds,
  Need for interventions with post-emergence weeding with herbicides;
  Need for intervention with insecticides such as Deltamethrin if the presence and/or activity of insects is detected;
  Verification of the need for any irrigation;
  General forecast of the day of harvest and of the expected quantity.
Active ingredients selected for use on this crop: 28 (with respect to the 38 provided at the EU level at the filing date of the patent). Among these, in particular, mention is made by way of example of Cycloxidim, Indoxacarb, Cymoxanil.
Pre-harvest safety interval in order to be able to be classified as "without residual pesticides": specific for each active ingredient (e.g., in the case of the Deltamethrin active ingredient, for controlling beaded chestnuts, it is 15/18 days).
Examples of treatments during the cultivation cycle.
1. Treatment for weeding during pre-emergence of the crop (prior to germination):
  A. Adversity: weeds;
  B. Active ingredients: Lenacil;
  C. Dose: 0.5 kg per hectare;
  D. Safety interval guaranteed by the producer for compliance with legal limits: 30 days.
2. Treatment for weeding after emergence of the crop (after germination);
  A. Adversity: wide- and narrow-leaf weeds;
  B. Active ingredient: Lenacil, Phenmedipham, Cycloxidim;
  C. Dose: respectively 0.300 kg per hectare, 1 kg per hectare, 1 liter per hectare;
  D. Safety interval guaranteed by the producer for compliance with legal limits: 30 days for Phenmedipham; 30 days for Lenacil; 20 days for Cycloxidim.
3. Treatment prior to harvesting of the crop:
  A. Adversity: beaded chestnuts;
  B. Active ingredient: Deltamethrin;
  C. Dose: 0.5 liters per hectare;
  D. Safety interval guaranteed by the producer for compliance with legal limits: 3 days.
Number of active ingredients analyzed in the laboratory: at least 400, with the possibility to add further analyses, if the technical agricultural engineer deems this appropriate on the basis of the risk assessments performed in the field.

Conveniently, the present disclosure solves the problems described earlier, providing an agronomic method for the production of vegetables and mushrooms that allows, by following it, to maintain, in the cultivated vegetables and mushrooms, minimal residues of pesticides, lower than a predefined threshold value, such as for example 0.01 mg/kg. In some cases, the predefined threshold value may coincide with the experimental detectability value.

Advantageously, the agronomic method for the production of vegetables and mushrooms according to the disclosure is suitable to ensure high agricultural productivity.

Efficiently, the agronomic method for the production of vegetables and mushrooms according to the disclosure produces a lower environmental impact than cultivation strategies of the conventional type, minimizing the use of pesticides and selecting the ones that have the lowest environmental impact.

Positively, the agronomic method for the production of vegetables and mushrooms according to the disclosure has different steps, even only in relation to some aspects, with respect to the steps of cultivation strategies of the conventional type.

Conveniently, the agronomic method for the production of vegetables and mushrooms according to the disclosure allows to obtain a production that is qualitatively superior (since it contains a substantially negligible or undetectable residue of pesticides) while bearing substantially low costs (which in any case can be compared with those of a cultivation method of the conventional type). The relatively simple practical execution of the method according to the disclosure, moreover, makes it safe in application.

The disclosure thus conceived is susceptible of numerous modifications and variations: all the details may further be replaced with other technically equivalent elements.

In the examples of embodiment shown, individual characteristics, given in relation to specific examples, may actually be interchanged with other different characteristics that exist in other examples of embodiment.

In practice, the materials used, as well as the dimensions, may be any and different according to requirements and to the state of the art.

The invention claimed is:
1. An agronomic method for the production of ripe vegetables and ripe mushrooms, comprising the steps of:
  performing a preventive analysis of the soils intended for cultivation, in order to identify the composition of the soils, a plurality of hydrologic characteristics, and verify the absence of pathogens, infesting organisms and pollutants, wherein the preventive analysis of the soils is verifying physical-chemical conditions of the soil, and the plurality of hydrologic characteristics is a texture of the soils, their slope, or availability of water;
  selecting among natural seeds and mycelia, not genetically modified, the ones most suitable for parameters of the soil identified by the preventive analysis of the soils and seeding the selected seeds and mycelia;
  performing iterated periodic checks on the vegetable, mushroom species, that grow after seeding and detect diseases, infestations, and/or infections thereof and localize areas where the disease and/or infestation has appeared;
  selecting a correct dosage of active ingredient for plant protection treatment, the correct dosage being dependent on an extent of the detected disease, infestation and/or infection in progress and on a growth stage of the vegetable and/or mushroom;

performing at least one plant protection treatment by using the selected dosage of active ingredients, the active ingredients being selected among insecticides, herbicides, acaricides, limacides and fungicides, wherein the treatment is performed only at the localized areas, avoiding any contact with the active ingredients for plant protection products of regions that are not affected by disease and/or infection;

near the time of harvest, performing iterated periodic spot checks of the vegetables, mushrooms, in order to measure the residual concentration of active plant protection principles by;

harvesting samples of cultivated vegetables, mushrooms, and measuring the residual concentration of active plant protection ingredients in the samples in laboratory, wherein between harvesting the samples of cultivated vegetables, mushrooms and measuring the residual concentration of active plant protection ingredients in laboratory a time comprised between 2 and 24 hours elapses;

harvesting the cultivated ripe vegetables, ripe mushrooms at full maturation and only when the residual concentration of active plant protection principles is lower than 0.01 mg/kg.

2. The method according to claim 1, wherein operations for measuring the residual concentration of active principles plant protection ingredients are performed in a laboratory by means of the instruments selected among gas chromatographs with specific detectors (ECD, NPD, FD), gas chromatographs coupled to mass spectrometers, liquid chromatographs with spectrophotometric detectors (diode array), liquid chromatographs coupled to mass spectrometers of the UPLC-MS (Ultra Performance Liquid Chromatography-Mass Spectrometry) type and atomic absorption spectrophotometers HPLC (High Performance Liquid Chromatography).

3. The method according to claim 1, wherein the selected seeds are related to vegetables of the type of Liliaceae, Solanaceae, Umbelliferae, Asteraceae, Lamiaceae, Brassicaceae, Cucurbitaceae, Leguminosae and Chenopodiaceae.

4. The method according to claim 3, wherein within said families of vegetables, the seeds are related to a vegetable selected among garlic, asparagus, basil, Swiss chard, broccoli, artichokes, carrots, cauliflowers, chicory, turnip greens, onion, chick peas, beans, Borlotti beans, green beans, broad beans, fennel, lentils, eggplant, peppers, potatoes, peas, tomatoes, leeks, parsley, celery, salad, endive, spinach, cabbages, pumpkin and zucchini.

5. The method according to claim 1, wherein the selected mycelia are related to mushrooms of the Agaricaceae type.

6. The method according to claim 1, wherein said at least one step of execution of at least one plant protection treatment provides for the selection of a specific formulation of the active ingredient in use,
of the dosage of the active ingredient in use,
of the modes of administration of the active ingredient in use,
of the regions of the cultivated soil to be subjected to the plant protection treatment with the active ingredient,
of the environmental and climate conditions in which the plant protection treatment with the active ingredient is to be performed.

7. The method according to claim 1, wherein said herbicides are selected among Aclinifen, Bentazon, Chloridazon, Chlorpropham, Clethodim, Clomazone, Clopiralid, Cycloxidim, Dicamba, Fenoxaprop-P-Ethyl, Fluazifop P-buthyl, Flufenacet, Imazamox, Lenacil, Linuron, Metamitron, Metazachlor, S-Metolachlor, Metribuzin, Napropamide, Oxadiazon, Pandimethalin, Phenmedipham, Propaquizafop, Propyzamide, Pyridate, Quizalofop P-ethyl, Quizalofop P-ethyl Isomer D, Rimsulfuron, and Triallate.

8. The method according to claim 1, wherein said insecticides are selected among Abamectin, Acetamiprid, Acrinathrin, Alpha cypermethrin, Azadirachtin, Benfluralin, Bufoprezin, Chlorantraniliprole, Chlorpyrifos, Chlorpyrifos Methyl, Cypermethrins (sum of alpha and zeta isomers), Deltamethrin, Emamectin Benzoate, Esfenvalerate, Etofenprox, Flonicamid, Fluvalinate Tau, Formetanate, Fosmet, Imidacloprid, Indoxacarb, Lambda Cyhalothrin, Metaflumizone, Methoxyfenozide, Primicarb, Pymetrozine, Pyrethrins, Spinosad, Spirotetramat, Teflutrin, Thiacloprid, Thiametoxam, and Zeta-cypermethrin.

9. The method according to claim 1, wherein said acaricides are selected among Bifenazate, Clofentezine, Etoxazole, Fenpyroximate, Hexythiazox, Spiromesifen, and Tebufenpyrad.

10. The method according to claim 1, wherein said fungicides are selected among Acibenzolar S Methyl, Ametoctradin, Azoxystrobin Benalaxyl, Boscalid, Bupirimate, Cyazofamid, Cyflufenamid, Cymoxanil, Cyproconazole, Cyprodinil, Difenoconazole, Dimetomorph, Famoxadone, Fembuconazole, Fenhexamid, Fluopicolide, Fluazinam, Fludioxonil, Fosetil Aluminium, Iprovalicarb, Mandipropamid, Meptyldinocap, Metalaxyl (isomer sum), Metalaxyl - M, Myclobutanil, Pencozanol, Cupric products/Copper, Propamocarb, Pyraclostrobin, Pyrimethanil, Tebuconazol, Tetraconazol, Trifloxystrobin, Triadimenol, and Sulfur.

11. The method according to claim 1, wherein said limacides are selected among ferric phosphate and metaldehyde.

12. An agronomic method for the production of ripe mushrooms, comprising the steps of:

performing a preventative analysis of the soils intended for cultivation, in order to identify the composition of the soils, a plurality of hydrologic characteristics, and verify the absence of pathogens, infesting organisms and pollutants, wherein the preventive analysis of the soils is verifying physical-chemical conditions of the soil, and the plurality of hydrologic characteristics is a texture of the soils, their slope, or availability of water;

selecting among natural mycelia, not genetically modified, the ones most suitable for parameters of the soil identified by the preventive analysis of the soils and seeding the selected mycelia;

performing iterated periodic checks on the mushroom species, that grow after seeding and detect biotic adversities and/or infestations thereof and localize areas where the disease and/or infestation has appeared;

selecting a correct dosage of active ingredient for plant protection treatment, the correct dosage being dependent on an extent of a disease, infestation and/or infection in progress and on a growth stage of the mushroom;

performing at least one plant protection treatment by using the selected dosage of active ingredients, the active ingredients being selected among insecticides, herbicides, acaricides, limacides and fungicides, wherein the treatment is performed only at the localized areas, avoiding any contact with the active ingredients for plant protection products of regions that are not affected by disease and/or infection;

near the time of harvest, performing iterated periodic spot checks of the mushrooms, in order to measure the residual concentration of active plant protection principles by;

harvesting samples of cultivated mushrooms, and measuring the residual concentration of active plant protection ingredients in the samples in laboratory, wherein between harvesting the samples of cultivated mushrooms and measuring the residual concentration of active plant protection ingredients in laboratory a time comprised between 2 and 24 hours elapses;

harvesting the cultivated ripe mushrooms at full maturation and only when the residual concentration of active plant protection principles is lower than 0.01 mg/kg.

13. An agronomic method for the production of ripe vegetables and ripe mushrooms, including the following steps:

performing a preventive analysis of the soils intended for cultivation, in order to identify the composition of the soils, a plurality of hydrologic characteristics, and verify the absence of pathogens, infesting organisms and pollutants, wherein the preventive analysis of the soils is verifying physical-chemical conditions of the soil, and the plurality of hydrologic characteristics is a texture of the soils, their slope, or availability of water;

selecting among natural seeds and mycelia, not genetically modified, the ones most suitable for parameters of the soil identified by the preventive analysis of the soils and seeding the selected seeds and mycelia, wherein the selected seeds are related to vegetables of Liliaceae, Solanaceae, Umbelliferae, Asteraceae, Lamiaceae, Brassicaceae, Cucurbitaceae, Leguminosae, and Chenopodiaceae;

performing iterated periodic checks on the vegetable, mushroom species, that grow after seeding and detect diseases, infestations, and/or infections thereof and localize areas where the disease and/or infestation has appeared;

selecting a correct dosage of active ingredient for plant protection treatment, the correct dosage being dependent on an extent of the detected disease, infestation and/or infection in progress and on a growth stage of the vegetable and/or mushroom;

performing at least one plant protection treatment by using the selected dosage of active ingredients, the active ingredients being selected among insecticides, herbicides, acaricides, limacides and fungicides, wherein the treatment is performed only at the localized areas, avoiding any contact with the active ingredients for plant protection products of regions that are not affected by disease and/or infection;

wherein said herbicides are selected among Aclinifen, Bentazon, Chloridazon, Chlorpropham, Clethodim, Clomazone, Clopiralid, Cycloxidim, Dicamba, Fenoxaprop-P-Ethyl, Fluazifop P-buthyl, Flufenacet, Imazamox, Lenacil, Linuron, Metamitron, Metazachlor, S-Metolachlor, Metribuzin, Napropamide, Oxadiazon, Pandimethalin, Phenmedipham, Propaquizafop, Propyzamide, Pyridate, Quizalofop P-ethyl, Quizalofop P-ethyl Isomer D, Rimsulfuron, and Triallate;

wherein said insecticides are selected among Abamectin, Acetamiprid, Acrinathrin, Alpha cypermethrin, Azadirachtin, Benfluralin, Bufoprezin, Chlorantraniliprole, Chlorpyrifos, Chlorpyrifos Methyl, Cypermethrins (sum of alpha and zeta isomers), Deltamethrin, Emamectin Benzoate, Esfenvalerate, Etofenprox, Flonicamid, Fluvalinate Tau, Formetanate, Fosmet, Imidacloprid, Indoxacarb, Lambda Cyhalothrin, Metaflumizone, Methoxyfenozide, Primicarb, Pymetrozine, Pyrethrins, Spinosad, Spirotetramat, Teflutrin, Thiacloprid, Thiametoxam, and Zeta-cypermethrin;

wherein said acaricides are selected among Bifenazate, Clofentezine, Etoxazole, Fenpyroximate, Hexythiazox, Spiromesifen, and Tebufenpyrad;

wherein said fungicides are selected among Acibenzolar S Methyl, Ametoctradin, Azoxystrobin Benalaxyl, Boscalid, Bupirimate, Cyazofamid, Cyflufenamid, Cymoxanil, Cyproconazole, Cyprodinil, Difenoconazole, Dimetomorph, Famoxadone, Fembuconazole, Fenhexamid, Fluopicolide, Fluazinam, Fludioxonil, Fosetil Aluminium, Iprovalicarb, Mandipropamid, Meptyldinocap, Metalaxyl (isomer sum), Metalaxyl - M, Myclobutanil, Pencozanol, Cupric products/Copper, Propamocarb, Pyraclostrobin, Pyrimethanil, Tebuconazol, Tetraconazol, Trifloxystrobin, Triadimenol, and Sulfur;

wherein said limacides are selected among ferric phosphate and metaldehyde;

near the time of harvest, performing iterated periodic spot checks of the vegetables, mushrooms, in order to measure the residual concentration of active plant protection principles by;

harvesting samples of cultivated vegetables, mushrooms, and measuring the residual concentration of active plant protection ingredients in the samples in laboratory, wherein between harvesting the samples of cultivated vegetables, mushrooms and measuring the residual concentration of active plant protection ingredients in laboratory a time comprised between 2 and 24 hours elapses;

harvesting the cultivated ripe vegetables, ripe mushrooms at full maturation and only when the residual concentration of active plant protection principles is lower than 0.01 mg/kg.

* * * * *